United States Patent
Barkan

(10) Patent No.: US 7,290,711 B2
(45) Date of Patent: Nov. 6, 2007

(54) SYSTEM AND METHOD FOR REDUCING MOTION SENSITIVITY IN AN IMAGER BASED OPTICAL CODE READER

(75) Inventor: Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 370 days.

(21) Appl. No.: 10/955,130

(22) Filed: Sep. 30, 2004

(65) Prior Publication Data

US 2006/0065732 A1   Mar. 30, 2006

(51) Int. Cl.
  *G06K 7/10*  (2006.01)
(52) U.S. Cl. ............. 235/462.06; 235/454; 235/462.01
(58) Field of Classification Search .......... 235/462.01, 235/462.06, 462.11, 462.22, 462.26
  See application file for complete search history.

(56) References Cited

U.S. PATENT DOCUMENTS

| | | | |
|---|---|---|---|
| 5,559,555 A | 9/1996 | Shimizu et al. | |
| 5,597,997 A | 1/1997 | Obata et al. | |
| 5,635,697 A | 6/1997 | Shellhammer et al. | |
| 5,986,705 A | 11/1999 | Shibuya et al. | |
| 6,073,851 A * | 6/2000 | Olmstead et al. | 235/462.45 |
| 6,155,488 A | 12/2000 | Olmstead et al. | |
| 6,254,003 B1 * | 7/2001 | Pettinelli et al. | 235/454 |
| 6,576,883 B1 | 6/2003 | McCoy | |
| 6,788,340 B1 | 9/2004 | Chen et al. | |
| 2002/0179713 A1 | 12/2002 | Pettinelli et al. | |

OTHER PUBLICATIONS

PCT International Search Report.
PCT/US2005/033897, mailed Mar. 27, 2006.

* cited by examiner

*Primary Examiner*—Karl D. Frech
(74) *Attorney, Agent, or Firm*—Carter, DeLuca, Farrell & Schmidt, LLP

(57) ABSTRACT

A system and method for reading an optical code is provided. The method comprises the steps of sensing incident light reflected from a target optical code to be imaged; generating an image signal including a plurality of electrical signals corresponding to the sensing; generating information relating to an amplitude of the image signal; and generating a control signal for adjusting an exposure time during the sensing in accordance with the information relating to the amplitude for minimizing sensitivity to motion.

20 Claims, 4 Drawing Sheets

SYSTEM AND METHOD FOR REDUCING MOTION SENSITIVITY IN AN IMAGER BASED OPTICAL CODE READER

BACKGROUND OF THE INVENTION

1. Field of the Invention

This invention relates to optical code readers. In particular, this invention relates to a system and method for reducing motion sensitivity in imager-based optical code readers.

2. Description of the Related Art

Optical codes are patterns made up of image areas having different light reflective or light emissive properties, which are typically assembled in accordance with a priori rules. The term "barcode" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type.

Optical code readers are used in either fixed or portable installations in many diverse environments such as in stores for check-out services, in manufacturing locations for work flow and inventory control, and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently the optical code reader includes a handheld sensor which is manually directed at a target code.

An example of a conventional optical code is a one-dimensional barcode symbol. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. A description of PDF417 barcode and techniques for decoding it are disclosed in U.S. Pat. No. 5,635,697 to Shellhammer et al., and assigned to Symbol Technologies, Inc., which is incorporated herein by reference in its entirety. Another conventional optical code is known as "MaxiCode". It consists of a central finder pattern or bull's eye center and a grid of hexagons surrounding the central finder. It should be noted that the aspects of the inventions disclosed in this patent application are applicable to optical code readers, in general, without regard to the particular type of optical codes which they are adapted to read. The invention described may also be applicable to some associated image recognition or analysis.

Optical code readers may be laser-based or imager-based. In a conventional imager optical code reader an imaging engine is provided having an image sensor having an array of cells or photo sensors, such as a charge coupled device (CCD). In a linear imager reader the array may have one or two rows of photo sensors. In an area imager reader the array may be two-dimensional having two or more rows of photo sensors. The imaging engine further includes a lens assembly for focusing light incident on the image sensor and associated circuitry coupled to the image sensor outputting an image signal including an array of electrical signals corresponding to a field of view of the imager reader. The electrical signals are digitized and provided as image data to a processor for processing thereof, including processing the image data for decoding the optical code.

When originally introduced, the imager readers were placed directly in contact with the optical code being read. Since then the working range of many imager readers has increased, providing a working range comparable to some laser readers. However, unlike laser readers which are insensitive to motion, the performance of the imager reader has been limited due to sensitivity to motion inherent to the imaging technology used in the imager reader.

In order to eliminate or reduce motion, the imager reader needs to be held steady while scanning each optical code, which can be tedious, tiresome and/or reduce productivity. In applications in which rapid scanning is performed the need to rush may cause an increase in motion, which may cause smearing of the captured image and possible misreads, resulting in potential frustration and further reduction in productivity.

Similar to other camera systems, motion sensitivity can be reduced by reducing exposure time. However, a reduction of exposure time causes a reduction of the amount of light detected by the photo sensors which degrades signal quality of the electrical signals. Signal quality is known to vary with respect to distance between the imager reader (e.g., the photo sensors) and the target optical code being imaged, as well as with respect to contrast of the target optical code. Accordingly, an arbitrary reduction of exposure time could result in an in inadequate signal quality and an inability to decode the signal when scanning conditions are not favorable to good signal quality.

In commercially available imager readers variations in signal quality have been handled in different ways. In one commercially available imager reader, the exposure time is fixed to provide adequate signal quality at the furthest distance between the target and the imager reader at which the imager reader is intended to function. The electrical signals generated by the photo sensors are relatively strong when an optical code is positioned close to the imager reader when the internal illumination system of the imager reader is most intense. As the optical code is positioned further away from the from the imager reader, the intensity of the illumination system decreases as its light spreads out over a larger area. Observations of the signals generated by the photo sensors reveal that the signals amplitudes' decrease as the barcode is moved further away until the signal ultimately becomes too small for signal processing circuitry of the imager reader to handle, at which point the imager reader cannot read the optical code. The commercially available imager reader adapts to the variation in signal amplitude for allowing the imager reader to have a relatively large working range by using a signal processing circuit/digitizer that adapts to signal amplitude.

In another commercially available imager reader a variable gain amplifier is used that adjusts the gain for maintaining the signal amplitude within a desired range. As the distance between the imager reader and the target optical code increases the gain increases as well. The exposure time is fixed to provide adequate signal quality at the furthest distance at which the imager reader is intended to function. In both of the imager readers discussed above, the working range is greater than most users need, while the exposure time is fixedly set to provide adequate signal quality when the distance between the imager reader and the target is relatively large, even though a shorter exposure time would provide adequate signal quality at the most commonly used working distances and reduced sensitivity to motion.

Accordingly, it is an aspect of the present disclosure to provide a system and method for reducing the motion sensitivity of imager readers.

SUMMARY OF THE INVENTION

In an embodiment of a system, in accordance with the present invention, an optical code reader system is provided. The system includes a photo sensor module for imaging a target optical code including sensing incident light and generating an image signal including a plurality of electrical signals corresponding to the sensing; and a shutter module having an adjustable shutter that controls exposure time of the photo sensor module in accordance with an exposure time setting. The system further includes a processor assembly having at least one processor receiving information relating to an amplitude of the image signal; and an exposure control module executable on the at least one processor for generating a control signal for adjusting the exposure time setting for controlling the adjustable shutter in accordance with the information relating to the amplitude.

In another embodiment of the invention, a method is provided for reading an optical code. The method includes the steps of sensing incident light reflected from a target optical code to be imaged; generating an image signal including a plurality of electrical signals corresponding to the sensing; generating information relating to an amplitude of the image signal; and generating a control signal for adjusting an exposure time during the sensing in accordance with the information relating to the amplitude.

In still another embodiment of the disclosure, a method for adjusting exposure time of an optical code reader is provided. The method includes the steps of providing for retrieving information related to an amplitude of an image signal; providing for evaluating the information related to the amplitude of the image signal; and providing for generating a control signal for setting an exposure time for acquiring a subsequent image signal in accordance with the evaluated information related to the amplitude.

In a further embodiment of the present invention a computer readable medium is provided for storing a set of computer readable instructions capable of being executed by at least one processor for adjusting exposure time of an optical code reader. The readable instructions include means for retrieving information related to an amplitude of an image signal; means for evaluating the information related to the amplitude of the image signal; and means for generating a control signal for setting an exposure time for acquiring a subsequent image signal in accordance with the evaluated information related to the amplitude.

BRIEF DESCRIPTION OF THE DRAWINGS

Various embodiments of the invention will be described herein below with reference to the figures wherein.

DETAILED DESCRIPTION OF THE PREFERRED EMBODIMENTS

The present invention provides an imager optical code reader which includes circuitry for adjusting an imaging exposure time setting (also known as integration time) for minimizing the exposure time for reducing the reader's sensitivity to motion. The adjustment of the exposure time setting is inversely related to the amplitude of signals output by photo sensors of the reader. Signal strength output by the photo sensor is typically increased when the distance between the reader and a target code is relatively small and when a target code has relatively good contrast. As the signal strength output by the photo sensors increases, the exposure time can be decreased, thereby decreasing sensitivity to motion. Accordingly, motion sensitivity can be reduced for relatively short distances between the reader and the target code and/or for imaging of target codes that have relatively good contrast.

Figure 1A:
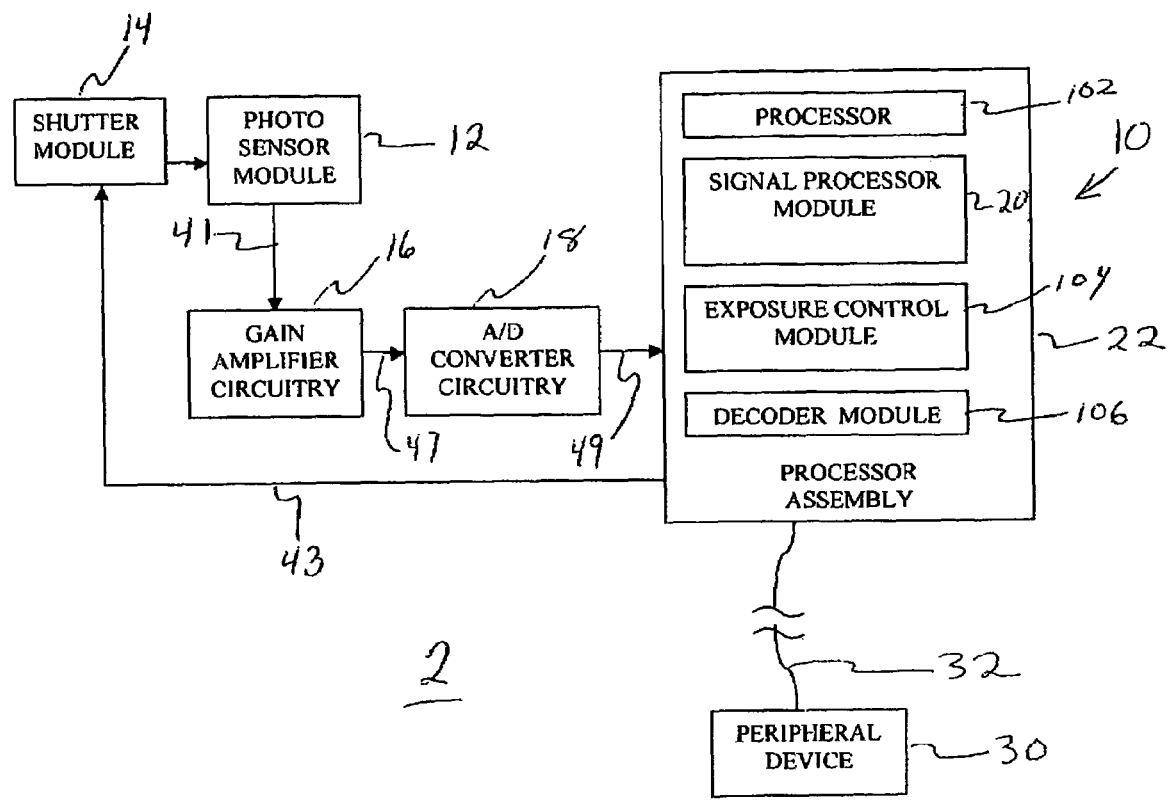
FIG. 1A is a block diagram of components of an embodiment of an optical code reader system in accordance with the present disclosure.

Reference should be made to the drawings where like reference numerals refer to similar elements throughout the various figures. With reference to FIG. 1A an embodiment of an exemplary optical code reader system 2 is shown having an imager optical code reader 10, which includes a photo sensor module 12, a shutter module 14, gain amplifier circuitry 16, A/D converter circuitry 18 and a processor assembly 22. The optical code reader 10 may be configured as a handheld, portable and/or stationary device. The optical code reader 10 may further be incorporated into another device, such as a PDA or cellular phone. The optical code reader may be in wired or wireless communication with at least another device 30, such as a host terminal or network via communication interface 32. For example, the optical code reader 10 may be implemented within a system including one or more components, such as a keyboard, display, printer, data storage, application software, and/or databases. The system may further be in communication with another system or network. Communication interface 32 may be wired or wireless and include, for example, a cable, telephone exchange network, either through a modem or an ISDN interface, an infrared data interface (IRDA) and/or a multi-contact shoe. Data transmitted by the communication interface 32 may include compressed data.

It is contemplated that components of the reader 10 may be combined or integrated together. For example, the gain amplifier circuitry 16 may be integrated with the photo sensor module 12, and the A/D converter circuitry 16 may be integrated with the processor assembly 22. It is further contemplated that components include in any of the components shown may be configured as separate components. For example, the signal processor 20 may include a dedicated processing device and be separate from the processor assembly 22.

The imager photo sensor module 12 includes an array of photo sensors for sensing light reflected from objects lying within the field of view (FOV) of the optical code reader 10. The image photo sensor module 12 generates an image signal 41 including an array of electrical signals representing an image which correspond to the sensing. The image signal 41 is provided to the gain amplifier circuitry 14. The array of photo sensors may include one or two rows of photo sensors for imaging a linear portion of a target being imaged, such as when the reader 10 is a linear imager reader.

Alternatively, the array of photo sensors may be a two-dimensional array of photo sensors for imaging a two-dimensional area of a target being imaged, such as in an area imager reader. The photo sensor module 12 may include a charge coupled device (CCD). However, it is to be understood that other area or linear image sensors may be used for the intended purpose, such as CMOS, charge modulated device (CMD) or charge injection device (CID) sensors. An objective lens assembly may be provided (not shown) which includes at least one lens for focusing light incident on the photo sensor module 12, and may further include a lens guidance assembly for supporting the at least one lens, and a lens adjustment mechanism for moving the at least one lens along the lens guidance assembly for changing the focus of the lens assembly.

The shutter module 14 includes an adjustable shutter, which preferably includes an electrical shutter, or may alternatively include a mechanical shutter. The shutter module 14 receives control signals 43 from the processor assembly 22 which control operation of the shutter module 14, which sets the exposure time when acquiring an image. In the case of an electric shutter, the exposure time is set by controlling devices (not shown) within the photo sensor via control signals 45. Accordingly, control signals 45 are generated in accordance with control signals 43 from the processor assembly 22. The shutter module 14 may be incorporated into the photo sensor module 12 or may be external to the photo sensor module 12.

The minimum exposure time needed for accommodating the intended working range of the reader 10 is determined. The working range refers the range of distances between the reader 10 (e.g., the photo sensor module 12) and the target being imaged. The working range may also refer to the range of contrasts of the optical code being imaged for which the reader is intended to be used. More specifically, the minimum exposure time needed for the maximum required distance is determined, where the maximum required distance is the upper limit of the working range, e.g., the maximum distance between the reader 10 and the target being imaged at which the reader 10 is intended to be used. Alternatively, the minimum exposure time needed for the lowest contrast of the working range with respect to contrast is determined. It is understood that in the description below, the minimum exposure time for the working range with respect to contrast could be used instead of the minimum exposure time for the maximum required distance.

The gain amplifier circuitry 16 includes one or more devices for processing the gain of image signal 41. The gain amplifier circuitry 16 is preferably a fixed gain amplifier, but is not limited thereto. The desired gain of the gain amplifier is preferably kept at a fixed value.

The desired gain to be provided by the gain amplifier circuitry 16 is determined to be the gain that is needed for increasing the amplitude of the image signal 41 to a desired amplitude when imaging at the maximum required range using the determined minimum exposure time. The desired amplitude is an amplitude which the signal processor module 20 can handle. The desired gain may be determined empirically or by using mathematical models. Accordingly, the desired gain may be selected in accordance with specifications of the signal processor module 20 being used in the reader 10. Alternatively, the signal processor module 20 may be selected to have specifications capable of processing signals having amplitudes within the range of amplitudes that will be generated at the maximum and minimum required distances. The gain amplifier circuitry 16 outputs a signal 47 which has been amplified by the determined gain.

It is contemplated that the system parameters, including the exposure time setting to be used at the maximum required distance, the gain, or the specifications of the signal processor module 20 may be selected in any order, where preferably, parameters already selected are used for selecting the other parameters. The parameters are preferably selected such that the exposure time used at the required maximum distance is minimized. It is further contemplated that an existing reader 10 may be upgraded in accordance with the present disclosure, where the gain amplifier circuitry 16 and/or the signal processor module 20 may be the original components of the existing reader 10 and the minimum exposure time for imaging at the maximum required distance is selected accordingly.

The working range at which the reader 10 is designed to operate at affects the setting for the desired gain which will be used. The reader should be designed to operate at a working range that accommodates the user's needs, but that is not substantially larger than will be needed by the user. A reader may be customized for a particular working range by installing gain amplifier circuitry having the appropriate desired gain for that working range. It is contemplated that the reader 10 may operate in at least two selectable modes, where each mode corresponds to a different working range. A different fixed gain is used for each respective mode. The gain may be adjustable in response to a condition, such as mode selection. The mode may be selected by the user or automatically by a component(s) of the system 2.

The A/D converter 18 converts the amplified signal 47 into digital signals, shown as data 49 which are capable of being processed by a digital processing device. The image signal 41 may be filtered by filtering circuitry (not shown) and/or a software module, where the filtering circuitry may be included with another component of the system 2, such as the gain amplifier circuitry 16 or the signal processor 20. The processed data 49 includes data signals that form an array, (preferably a two-dimensional array for an area imager reader and a one-dimensional array for a linear imager reader), of pixel information corresponding to the target being image, which are provided to the processor assembly 22, such as for decoding, image recognition or analysis thereof.

The processor assembly 22 includes at least one processor 102, which may include a microprocessor(s), a field programmable gate array (FPGA) and/or other processing device(s), and may further include at least one storage component, such as a flash memory device and/or a static RAM memory device. Further, the processor assembly 22 may communicate with the at least one peripheral device 30, such as the host processor. The processor assembly 22, or portions thereof, may be incorporated into the reader 10 or externally there to, such as in the host processor. Components of the reader 10, such as the A/D converter, may be incorporated into the processor assembly 22, e.g., be provided on the same chip, or share devices with the processor assembly 22.

The processor assembly 22, further includes a signal processor module 20, an exposure control module 104 and a decoder module 106 all of which are executable on the at least one processor 102. The exposure control module 104 and the decoder module 106 are software modules which include a series of programmable instructions executable on the at least one processor 102. The signal processor module 20 may also be implemented as a software module including a series of programmable instructions executable on the at least one processor, where the signal processor module 20, exposure control module 14 and decoder module 106 may execute on the same or different processors of the at least one processor. The series of programmable instructions can be stored on a computer-readable medium, such as ROM, flash memory, RAM, a hard drive, CD-ROM, smart card, 3.5" diskette, etc., or transmitted via propagated signals for being executed by the processor assembly 22 for performing the functions disclosed herein and to achieve a technical effect in accordance with the invention. The processor assembly 22 is not limited to the software modules described. The functions of the respective software modules may be combined into one module or distributed among a different combination of modules.

The processor assembly 22 may further include additional software modules executable on the at least one processor 102 for providing control to components of the reader 10 and/or process data 51, other than for decoding thereof. For example, the processor assembly 22 may include a module for generating lens adjustment control signals for controlling the lens adjustment mechanism.

The signal processor module 20 includes a signal processor for performing digital signal processing operations on data 49, such as edge detection, so that the data 49 are ready for further processing, such as decoding. A more sophisticated signal processor may be capable of processing signals having a relatively low signal to noise rations, allowing use of lower exposure times, and thus a greater immunity to motion. However, a sophisticated and expensive signal processor is not necessary. The exposure time is adjustable for providing maximum immunity to motion for whatever type of signal processor is used.

The exposure control module 104 processes the data 49 before signal processing has been performed by performing an algorithm for determining an overall amplitude rating for the data 49. The amplitude rating may be determined, for example, by determining signals from data 49 that correspond to an optical code being imaged, and processing high and low points of the signals. The algorithm may filter out amplitudes of data signals that seem to be associated with noise. Furthermore, the algorithm may include processing amplitudes that are grouped in a manner which indicates that they are associated with an optical code and generating an overall amplitude rating for the amplitudes that are associated with the optical code. The exposure control module 104 generates control signal 43 for controlling the shutter module 14 in order to control the exposure time of the photo sensor module 12 in accordance with the amplitude rating.

The control signal 43 is generated to control the exposure time so that the exposure time is inversely related to the amplitude rating. More specifically, when the exposure control module 104 determines that the data 49 have a relatively high amplitude rating, indicating that the signal quality is relatively strong due to a relatively short reading distance between the reader 10 and the target being imaged or that the contrast of the target is relatively good, the control signal are generated for adjusting the exposure time to a relatively short time for minimizing sensitivity to motion. Likewise, when the exposure control module 104 determines that the data 49 have a relatively low amplitude rating, indicating that the signal quality is relatively poor due to a relatively long reading distance or poor target contrast, the control signal 43 is generated for adjusting the exposure time to a relatively long time for improving the signal quality.

For a mechanical shutter, the control signal 43 may be converted into an analog signal having a characteristic (such as voltage) that corresponds to the value of the corresponding control signal. For example, the mechanical shutter may be controlled for opening the shutter an amount of time that corresponds to a magnitude of the characteristic of the analog control signal.

The exposure control module 104 may increases and decreases the exposure time setting in accordance with the amplitude rating, but only within a predetermined range defined by minimum and maximum threshold values. For each mode a different predetermined exposure time range may be used, where respective modes have a different gain setting which is optimized for use with a particular working range of the reader device 10. While operating in a particular mode, when the exposure control module adjusts the threshold exposure time setting so that it reaches either of the minimum or maximum threshold values for the exposure time range associated with the particular mode, a different mode may be selected automatically or manually. The event of reaching a minimum or maximum threshold value for the exposure time range may be indicated to the reader, such as via an audible beep or a displayed message, upon which the reader may take action, such as changing mode or manually selecting a different mode. For automatic mode selection, the event of reaching a minimum or maximum threshold value may trigger an automatic mode selection change, which would cause a different gain setting to be selected in accordance with the new mode selected.

The decoder module 106 receives or retrieves output from the signal processor module 20, retrieves an optical code or portion thereof from the output, performs a decode operation on the respective optical code and outputs a corresponding decoded code. It is contemplated that when receiving a partial code, the decoder module 106 may retrieve at least another portion of the code as needed for decoding thereof. The decode operation may include decoding a barcode or other type of symbol, such as a text code including alphanumeric characters. The decoding process may include character recognition processing.

Figure 1B:
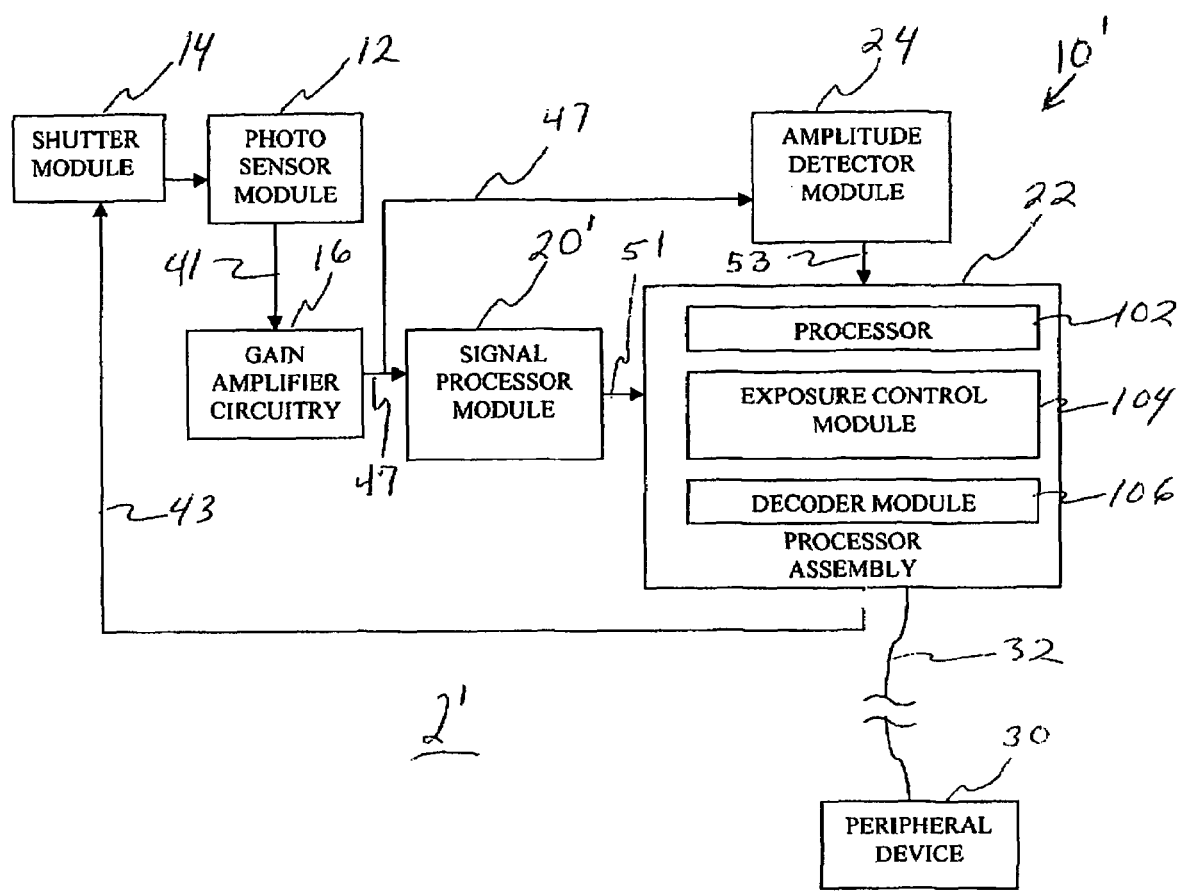
FIG. 1B is a block diagram of components of another embodiment of the optical code reader system in accordance with the present disclosure.

In the embodiment shown in FIG. 1B, a system 2' having a reader 10' is shown which is similar to the system 2 and reader 10, respectively, shown in FIG. 1A. Other than the below described differences between readers 10 and 10', the herein disclosed description with respect to the structure and functionality of system 2 and reader 10 and their components applies to system 2' and reader 10', respectively.

The readers 10 and 10' and operation thereof are configured the same except that the reader 10 in FIG. 1A includes the A/D converter circuitry for converting signal 47 to digital data 49, and the signal processor module 20 is a digital signal processor which processes the data 49 and is included with the processor assembly 22. The reader 10' in FIG. 1B has a signal processor module 20' that includes a digitizer for digitizing and processing signal 47 and outputting data 51 to the processor assembly for processing thereof, such as decoding. An amplitude detector module 24 is provided for receiving signal 47 output by the gain amplifier circuitry 16 and determining the amplitude of the signal 47 and outputting a digital signal 53 indicative of the amplitude of signal 47. Alternatively, the amplitude detector module 24 may process image signal 41 for determining the amplitude thereof and outputting signal 53 which is indicative of the amplitude of image signal 41. The digital signal 53 is processed by the exposure control module for adjusting the exposure time as appropriate.

The signal processor 20' includes a digitizer for digitizing signal 47, and may further include filter circuitry and/or a software module for filtering the signal 47. The signal processor 20' may include analog and or digital devices for processing the signal 47 for converting the signal 47 into a form and/or format that is capable of being processed by the processor assembly 22.

Figure 2A:
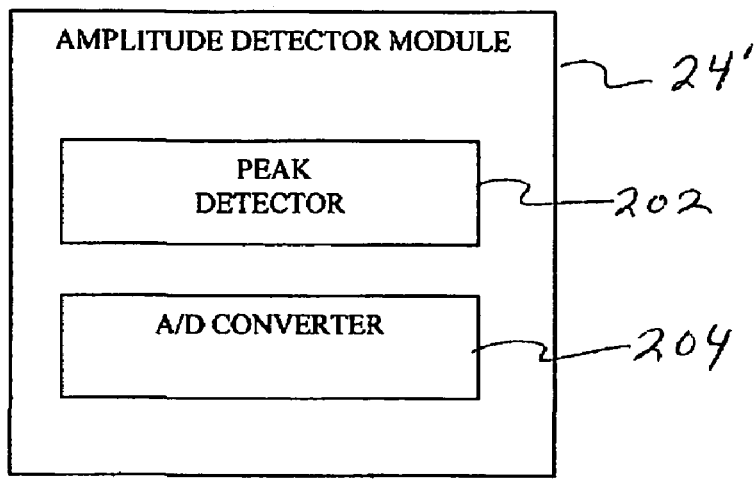
FIG. 2A is a block diagram of an embodiment of an amplitude detector module of the optical code reader system shown in FIG. 1B.
Figure 2B:
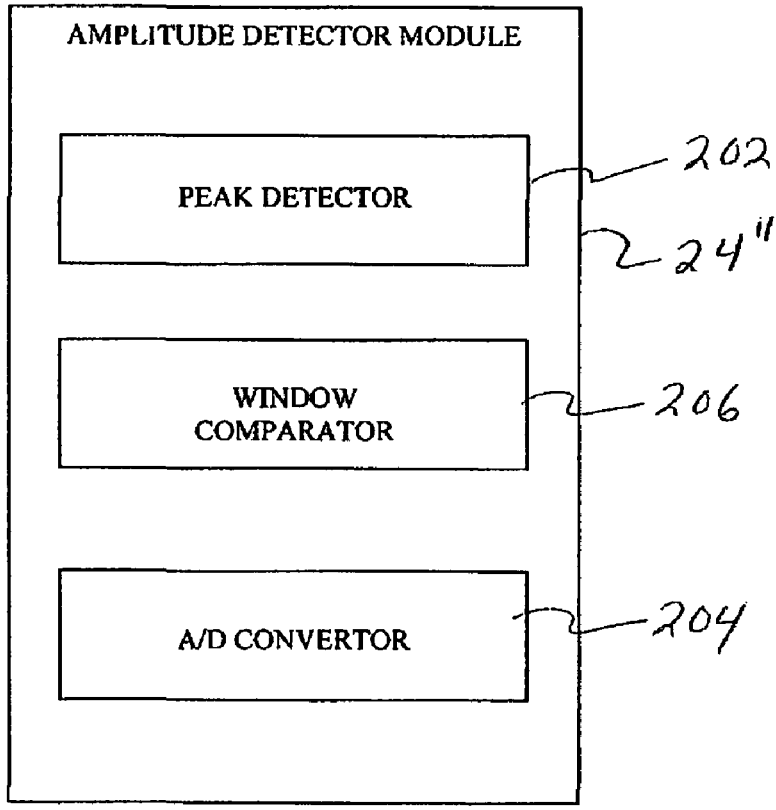
FIG. 2B is a block diagram of another embodiment of the amplitude detector module of the optical code reader system shown in FIG. 1B.

FIGS. 2A and 2B show first and second embodiments, respectively, of the amplitude detector module 24, indicated by reference numerals 24' and 24", respectively. With reference to FIG. 2A, the detector module 24' includes peak detector circuitry 202 and A/D converter circuitry 204. The peak detector circuitry 202 generates a signal 203 having a voltage that is proportional to at least one amplitude of signal 47. The A/D converter 204 converts the signal 203 into a digital signal 53 that is indicative of the voltage, and thus is indicative of the amplitude of signal 47.

With reference to FIG. 2B, the amplitude detector module 24" includes peak detector circuitry 202 and window comparator circuitry 206. The window comparator circuitry 206 includes at least one window comparator for outputting a signal 53 that indicates if the voltage of the signal 203 is below a predetermined threshold value (Vref) (e.g., signal 53 is "LOW" when the voltage of signal 203 is below the threshold value and otherwise signal 53 is "HIGH"). When more than one window comparator is provided, each window comparator may have a different Vref. Furthermore, it is contemplated that circuitry may be provided for outputting signal 53 so that it indicates specifically underneath which Vref(s) of the respective window comparators the voltage of signal 203 lies. The amplitude detector module 24 may include the A/D converter circuitry 204 for converting signal 53 into digital form if the signal 53 is not yet in digital form. The signal 53 which is indicative of the amplitude of the signal 47 is output in digital form for processing by the processor assembly 22.

The exposure control module 104 processes signal 53 for determining the amplitude rating of signal 47 and adjusting the exposure time accordingly. For the embodiment shown in FIG. 2A, the signal 53 is indicative of an actual amplitude, and an algorithm is provided for determining the desired exposure time which would be appropriate for the amplitude rating, and generates control signal 43 for adjusting the exposure time accordingly. For the embodiment shown in FIG. 2B, when the signal 53 indicates that the amplitude of signal 47 (or 41) is underneath the predetermined threshold value, the exposure control module 104 sends control signal 43 to increase the exposure time from a first exposure time setting to a second exposure time setting, or vice versa, as appropriate. It is contemplated that in the embodiment in which signal 53 indicates specifically which Vrefs of a plurality of Vrefs the amplitude of signal 47 (or 41) is below, the control signal 43 is generated for increasing or decreasing the exposure time accordingly, where the exposure time setting is selected from several exposure time settings, where the individual exposure time settings correspond to the respective Vrefs.

In operation, the system 2 or components thereof may lay idle, be powered down or be active while waiting for a read operation to be initiated. Results of a read operation (such as a decoded code) will not be output until the read operation is initiated. A read operation may be initiated via an actuator, such as a trigger or a switch (hardware or software), which may be activated by a user, a sensor, a processor, a host terminal, etc., for generating an actuation signal upon activation thereof for initiating a read operation. The actuation signal may be generated by the host terminal and received by the optical code reader 10, such as in the form of a command. Upon generation of the actuation signal the reader 10 and/or system 2 is prepared to perform the read operation, which may include powering up, enabling and/or initializing the components of the system 2 and the appropriate communication paths so that the necessary sensing, processing and transmissions will take place for attempting the read operation and outputting any results.

Initializing components of the system 2 may include, for example, setting the exposure time setting to a default value by the exposure control module 104. The exposure time default value may be determined (empirically or mathematically) to be the minimum exposure time appropriate for the most common distance at which the reader is expected to be used. The default value may be fixed or may be selectable by the user. The gain is preferably fixed. However, in the embodiment described in which the reader 10 may operate in different modes having respective different fixed gain settings, a default mode is assigned to the reader, where the default mode may be selectable by the user or fixed.

Once initialized, the photo sensor module senses incident light with the default exposure time setting. The photo sensor module 12 may continue to sense incident light and output a series of signals 41 (e.g., a sequence of frames of image data) until occurrence of an event, such as a successful read or a timeout condition occurs. The gain amplifier circuitry 16 amplifies the signal 41 by amplifying the array of electrical signals of the image signal 41.

With reference to the embodiment shown in FIG. 1A, the A/D converter circuitry 18 converts the signal 47 into a digital signal by sampling and converting the pixel signals of the array of signals into digital signals. The signal processor module 20 processes the data 49 for preparing the data 49 to be in a form and format for processing by the decoder module 106. The decoder module 106 attempts a decode operation on the processed data 49, and if successful outputs a decoded code, such as to the host processor of the peripheral device 30. If the decode operation is unsuccessful the decoder module waits for receipt of a next frame of data 49 for attempting a decode operation thereupon. A timeout condition may occur when the amount of time passed since the actuation signal was received exceeds a predetermined threshold value without performing a successful decode operation. While the decode operation is being performed, the exposure control module 104 processes the data 49 to determine the amplitude rating of the data 49 and output a control signal to the shutter 14 for setting the exposure time.

With reference to the embodiment shown in FIG. 1B, the signal processor module processes the signal 47 and outputs data 51, which is provided to the decoder module 106 for decoding thereof, as described above. Concurrent with processing of data 51 by the decoder module 106, the amplitude detector module 24 processes the signal 47 and outputs data 53 which is processed by the exposure control module 104.

Figure 3:
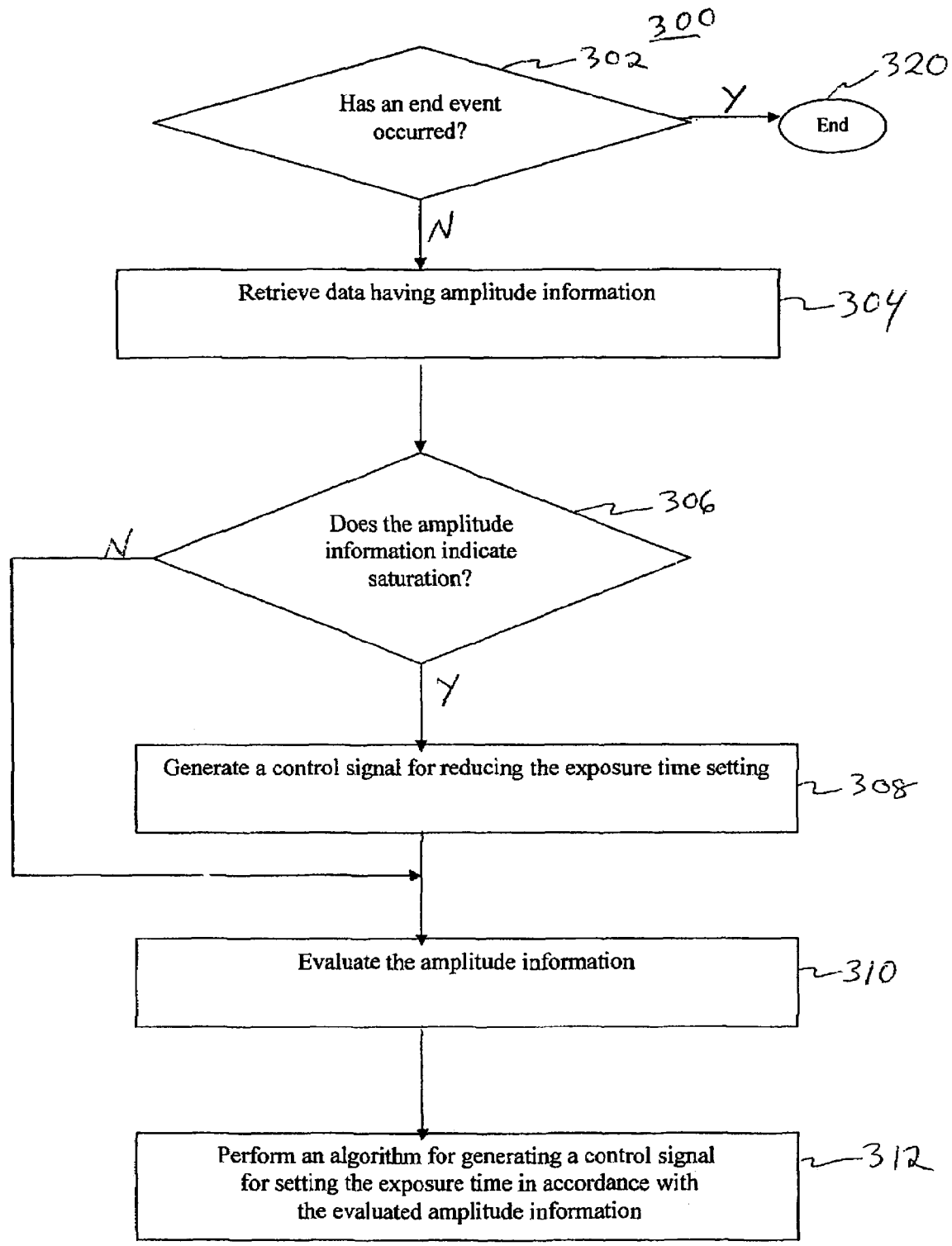
FIG. 3 is a flowchart of steps executed by an exposure control module of an optical code reader in accordance with the present disclosure.

With reference to FIG. 3, an exemplary flowchart 300 is provided showing steps performed by the exposure control module 104. At step 302, a determination is made if an end event has occurred, such as a successful decode or a timeout condition. If so, an end step 320 is executed. Otherwise, at step 304, data having amplitude information related to the amplitude of the next available frame of image data is retrieved for evaluating amplitude thereof. With reference to the embodiment shown in FIG. 1A, the retrieved data is retrieved from data 49. With reference to the embodiment shown in FIG. 1B, the retrieved data is retrieved form data 53 which is received from the amplitude detector module 24.

At step 306, a determination is made if the amplitude information indicates that the amplitude of the image data has reached a maximum level (MAX), e.g., a saturation level. With reference to the embodiment shown in FIG. 1A, the amplitude of signals included in the retrieved data is evaluated for indications of saturation. With reference to the embodiment shown in FIG. 1B, the amplitude information included in data 53 is evaluated for indications of saturation.

If indications of saturation are determined to exist, at step 308, a control signal 43 is generated for reducing the exposure time setting, after which control returns to step 302. The amount by which the exposure time is reduced may be decided in accordance with design choice. In the current example, the exposure time setting is reduced to half of its current value.

If a determination is not made that indications of saturation exist, at step 310, the amplitude information provided with the retrieved data is evaluated. With reference to the embodiment shown in FIG. 1A, the amplitude of signals of data 49 are evaluated for determining an amplitude rating thereof, which is an overall amplitude level for the data 49. The amplitude rating may be determined by locating portions of data 49 that are likely to correspond to an imaged optical code and determining the amplitude rating for that data. With reference to the embodiment shown in FIGS. 1B and 2A, the amplitude information included in data 53 is evaluated for determining an amplitude rating thereof. The amplitude rating may be determined by locating amplitude information within data 53 that is likely to correspond to an imaged optical code and determining the amplitude rating for that data. With reference to the embodiment shown in FIGS. 1B and 2B, the value of data 53 is determined, where the value includes information which rates the overall amplitude of the image data.

At step 312, the control signal 43 is generated in accordance with an algorithm for determining an appropriate exposure time in accordance with the evaluated amplitude. With reference to the embodiment shown in FIG. 1A, and the embodiment shown in FIGS. 11B and 2A, the algorithm may include a function for varying the exposure time linearly or nonlinearly in inverse relation to the amplitude rating, or by using a mapping, such as look-up-table (LUT) or continuous curve. Next, control returns to step 302. With reference to the embodiment shown in FIGS. 1B and 2A, the control signal 43 is generated in accordance with an algorithm for determining an appropriate exposure time in accordance with the value of data 53. For example, when the value of data 53 indicates that the amplitude of data 47 was below one of the Vref values, the exposure time may increased by a percentage of its current value or be increased to a predetermined exposure time value, where the percentage or the predetermined exposure time value corresponds to the particular Vref value. When the value of data 53 indicates that the amplitude of signal 47 is sufficiently high, the exposure time value is not adjusted. If it is determined that the value of data 53 indicates that the amplitude of signal 47 is higher than is necessary for reliable signal processing, the exposure time value is decreased. For example, the exposure time value may be may decreased by a percentage of its current value or be decreased to a predetermined exposure time value, where the percentage or the predetermined exposure time value corresponds to the particular Vref value.

Thus, a reader is provided that does not require expensive signal processing or variable gain adjusting components, where sensitivity to motion is reduced, and can be minimized in accordance with the intended working range of the reader.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. An optical code reader system using at least one working range comprising:
   a photo sensor module for imaging a target optical code including sensing incident light and generating an image signal including a plurality of electrical signals corresponding to the sensing;
   a shutter module having an adjustable shutter that controls exposure time of the photo sensor module in accordance with an exposure time setting;
   a processor assembly having at least one processor receiving information relating to an amplitude of the image signal; and
   an exposure control module executable on the at least one processor for generating a control signal for minimizing the exposure time setting in accordance with the information relating to the amplitude and a selected working range of the at least one working range for minimizing sensitivity of the reader system to motion during imaging of the target optical code.

2. The system according to claim 1, further comprising a decoder module executable on the at least one processor for receiving and decoding an imaged optical code acquired in the image signal.

3. The system according to claim 1, further comprising gain amplifier circuitry for processing gain of the image signal, wherein a fixed gain is selected for each respective working range of the at least one working range.

4. The system according to claim 3, wherein the system is operable in at least two selectable modes, each mode corresponding to a different working range of the at least one working range, wherein a different predetermined range of exposure times bounded by a maximum and a minimum value corresponds to the respective modes.

5. The system according to claim 4, wherein a different mode is selected and the gain setting is changed to the fixed gain setting corresponding to the different mode when the control signal adjusts the exposure time setting to a value that reaches the minimum or maximum value of the exposure time range of the current mode.

6. The system according to claim 1, wherein the information relating to the amplitude corresponds particularly to data of the image data which is determined to correspond to an optical code.

7. The system according to claim 1, further comprising a signal processor; and wherein adjusting the exposure time setting includes minimizing the exposure time setting while setting the exposure time setting to be sufficiently large for acquiring a subsequent image signal having an amplitude that is sufficiently large to be processed by the signal processor.

8. The system according to claim 1, further comprising an amplitude detection module for analyzing the image signal for generating the information related to the amplitude of the image signal.

9. The system according to claim 8, wherein the amplitude detection module comprises:
   peak detector circuitry for processing the image signal and outputting a signal having a voltage indicative of at least one amplitude of the image signal; and
   A/D converter circuitry for converting the voltage into a digital signal that is capable of being processed by the exposure control module.

10. The system according to claim 8, wherein the amplitude detection module comprises:

peak detector circuitry for processing the image signal and outputting a signal having a voltage indicative of at least one amplitude of the image signal; and comparator circuitry for generating a signal included with the information related to the amplitude of the image signal, where the signal generated by the comparator circuitry indicates when the voltage is below a predetermined threshold value.

11. The system according to claim 1, wherein the exposure control module controls the exposure time setting to be inversely related to an amplitude of the image signal.

12. A method for reading an optical code comprising the steps of:

sensing incident light reflected from a target optical code to be imaged using a working range selected from at least one working range;

generating an image signal including a plurality of electrical signals corresponding to the sensing;

generating information relating to an amplitude of the image signal; and generating a control signal for minimizing an exposure time during ongoing sensing in accordance with the information relating to the amplitude and the selected working range for minimizing sensitivity of the reader system to motion during the sensing.

13. The method according to claim 12, further comprising the step of processing gain of the image signal, wherein a fixed gain is selected for each respective working range of the at least one working range.

14. The method according to claim 12, wherein the minimizing the exposure time comprises setting the exposure time so that the exposure time is inversely related to an amplitude of the image signal.

15. The method according to claim 12, further comprising the step of determining data of the image data that corresponds to an optical code, wherein the information relating to the amplitude corresponds particularly to the determined data.

16. A method for adjusting exposure time of an optical code reader comprising the steps of:

providing for receiving information related to an amplitude of an image signal, wherein the image signal is acquired using an optical code reader;

providing for determining a portion of the received information that corresponds particularly to an image of an optical code acquired by the code reader;

providing for evaluating the determined portion of information; and providing for generating a control signal for minimizing an exposure time setting for acquisition of a subsequent image signal using the optical code reader in accordance with a result of the evaluation for minimizing sensitivity of the optical code reader to motion during acquisition of the image signal.

17. The method according to claim 16, wherein the exposure time setting is inversely related to an amplitude of the image signal.

18. The method according to claim 16, further comprising the step of providing for determining if the information related to the amplitude of the image signal indicates that an amplitude of the image signal has reached a saturation level; and if so, the providing for generating the control signal includes reducing the exposure time setting.

19. The method according to claim 16, wherein the providing for evaluating includes providing for generating an amplitude rating that is indicative of an overall amplitude of the determined portion of information.

20. A computer readable medium storing a set of computer readable instructions capable of being executed by at least one processor for adjusting exposure time of an optical code reader, the readable instructions comprising:

means for receiving information related to an amplitude of an image signal, wherein the image signal is acquired using an optical code reader;

providing for determining a portion of the received information that corresponds particularly to an image of an optical code acquired by the code reader;

means for evaluating the determined portion of information; and means for generating a control signal for minimizing an exposure time setting for acquisition of a subsequent image signal using the optical code reader in accordance with a result of the evaluation for minimizing sensitivity of the reader system to motion during imaging of the target optical code.

* * * * *